(12) United States Patent
Wei et al.

(10) Patent No.: US 6,665,630 B2
(45) Date of Patent: Dec. 16, 2003

(54) METHOD OF FORMING A VIRTUAL THREE-DIMENSIONAL RADAR DISPLAY

(75) Inventors: Edna Tan Wei Wei, Singapore (SG); Chan Chia Wei, Singapore (SG); Tan Juay Thiam, Singapore (SG)

(73) Assignee: Singapore Technologies Aerospace Ltd., Singapore (SG)

( * ) Notice: Subject to any disclaimer, the term of this patent is extended or adjusted under 35 U.S.C. 154(b) by 132 days.

(21) Appl. No.: 09/873,060

(22) Filed: Jun. 1, 2001

(65) Prior Publication Data

US 2002/0019720 A1 Feb. 14, 2002

(30) Foreign Application Priority Data

Jun. 2, 2000 (SG) ........................ 200003042-9

(51) Int. Cl.$^7$ ............................ G09G 5/00; G06F 15/62
(52) U.S. Cl. ............................ 702/155; 345/7; 345/419
(58) Field of Search ............................ 702/155; 345/7, 345/8, 9, 419; 340/980; 359/630

(56) References Cited

PUBLICATIONS

Elite Personal Simulator Newsletter, "New Version Elite v6 lunched", p. 1–3, Sep. 12, 1999.*
Publication by The Elite Personal Simulator Prop V6.1 Company, pp. 6, 8, 9, 10. No Dates.

* cited by examiner

*Primary Examiner*—Kamini Shah
(74) *Attorney, Agent, or Firm*—George O. Saile; Stephen B. Ackerman; Billy Knowles

(57) ABSTRACT

A method of forming a virtual three-dimensional radar display on a radar page comprising the steps of (i) establishing a split window display showing a 2-dimensional view of altitude representation of own ship and target's information; and (ii) combining range and azimuth information onto the radar page, thereby the radar page provides the pilot of an aircraft with a three-dimensional perspective of the own ship and targets' profile. The three-dimensional perspective of the own ship and targets information greatly enhances the situation awareness of the pilot.

21 Claims, 4 Drawing Sheets

METHOD OF FORMING A VIRTUAL THREE-DIMENSIONAL RADAR DISPLAY

BACKGROUND OF THE INVENTION

(1) Field of the Invention

The present invention relates generally to radar display, and in particular, to a method of forming a virtual three-dimensional radar display to provide a three-dimensional perception to include new display information such as the representation of own ship and targets' information as well as navigation information.

(2) Description of the Prior Art

In conventional radar page, the conventional B scope range and azimuth display does not have the capability of displaying targets with the same range and azimuth but with different altitude. This drawback of the conventional radar page limits the targets' information presented to the pilot of an aircraft and may create a wrong perception to the pilot whereby a two-target scenario may be mistaken to be a single target situation.

Further, the current flight information in the conventional radar page does not provide a good indication of the pitch of the aircraft. This is critical especially during the air combat when the pilot may be too engrossed in chasing target while not noticing that his own ship may be anytime hitting the ground if the dive continues. In high-intensity air combat scenarios, it is crucial to keep all the flight information within the pilot's view.

Pilots require better situational awareness to deal effectively with immediate and potential up-coming threats. All information presented to the pilot in the radar display must be useful enough for him to accomplish his task. By incorporating some flight information and with a graphical representation of the own ship condition in the look-down display, especially on the radar page, which is commonly used to designate targets during air combat, the pilot could easily monitor the overall situation, not only the outside world but also the own ship condition.

In view of the foregoing discussion, it is apparent that there currently exists the need for a modification of existing radar display to provide a larger multi-function display allowing more useful data to be represented in the most optimized form to the pilot.

SUMMARY OF THE INVENTION

Accordingly, one aspect of the present invention is to provide a method of forming a virtual three-dimensional radar display on a radar page comprising the steps of (i) establishing a split window display showing a 2-dimensional view of altitude representation of own ship and target's information; and (ii) combining range and azimuth information onto the radar page, and therefore the radar page providing the pilot of an aircraft with a three-dimensional perspective of the own ship and targets' profile.

A further aspect of the present invention is to provide a method of formation of a virtual three-dimensional radar display, wherein a larger rectangular multi-function display is used to optimize the display of own ship and targets' information to the pilot of the aircraft.

An object of the present invention is to provide a method of formation of a virtual three-dimensional radar display, wherein flight information of an aircraft are integrated to the radar display.

Another object of the present invention is to provide a method of formation of a virtual three-dimensional radar display, wherein the display is able to show the targets' information represented not only in range and azimuth but also third axis, altitude, which is shown in a split display window within the same display.

A further object of the present invention is to provide a method of formation of a virtual three-dimensional radar display, wherein the targets' information gives the pilot a three-dimensional perspective of the targets' profile.

Yet a further object of the present invention is to provide a method of formation of a virtual three-dimensional radar display, wherein the drawback of displaying targets of the same range and azimuth but of different altitude as in the conventional B scope display is mitigated.

A further object of the present invention is to provide a method of formation of a virtual three-dimensional radar display, wherein the three-dimensional perspective of the own ship and target's information greatly enhances the situation awareness of the pilot.

Yet a further object of the present invention is to provide a method of formation of a virtual three-dimensional radar display, wherein the flight information is incorporated into the radar display to assist the pilot in flying when the pilot is looking down into the cockpit of the aircraft.

Another object of the present invention is to provide a method of formation of a virtual three-dimensional radar display, wherein the pitching or rolling of the aircraft is clearly indicated to the pilot in the split display window.

These together with other objects features and advantages of the invention will become more readily apparent from the following detailed description when taken in conjunction with the accompanying drawings.

DESCRIPTION OF THE PREFERRED EMBODIMENTS

The present invention is a modification that improves existing 2-dimensional display to provide a three-dimensional perception to the pilot of an aircraft.

In accordance with the present invention, the method of forming a virtual three-dimensional radar display comprises the steps of (i) establishing a split window display showing a 2-dimensional view of altitude representation of own ship and target's information; and (ii) combining range and azimuth information onto the radar page, thereby the radar page providing the pilot of an aircraft with a three-dimensional perspective of the own ship and targets' profile.

Figure 1:
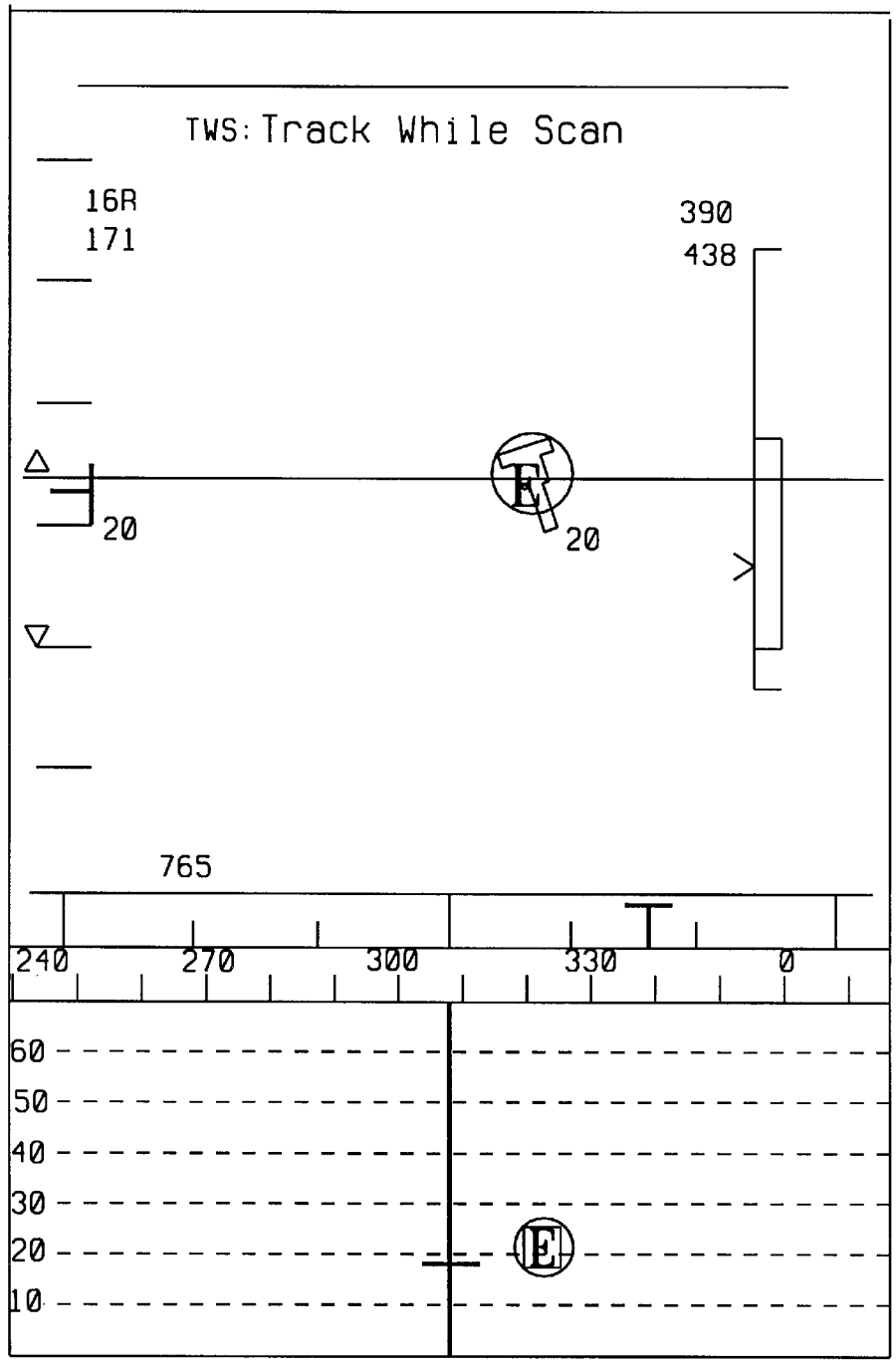
FIG. 1 is a multi-function radar display in dual mode display in accordance with the present invention.

In accordance with the present invention, the radar page includes a split display showing a 2-dimensional view of the altitude representation of the own ship and targets' information, and by combining with the range and azimuth information, the present radar page provides the pilot a three-dimensional perspective of the own ship and targets' profile. Referring to FIG. 1, there is shown a radar page having a split display of the altitude representation of the own ship and targets' information. As shown in the figure, the range and azimuth information are included to give the pilot of the aircraft a three-dimensional perspective of the own ship arid target's profile. Referring to the upper two regions in the window display (blue and brown color regions, respectively, in a real ship display) of FIG. 1, the target is represented in a range/azimuth format in the upper window (bird's eye view). The number besides the symbol indicates the target altitude, and the symbol rotates in a direction defined by the target aspect angle, which is defined as the angle between the target aircraft's velocity vector and the aircraft-to-target line of sight vector projected onto X-Y plane. The line extended from the target symbol increases as the absolute target velocity increases. The lettering within the target symbol denotes the identity of the target. Different shade will be used to indicate the proximity of the target to the own ship. The scale found in the lower portion of the window provides an indication on the heading of the own ship. The horizon is represented as the center of the two regions having blue and brown background, respectively, in a real ship display. In the present preferred embodiment, this acts just like the aircraft attitude direction indicator which varies proportionally with the aircraft flying condition.

Whenever there is a bugged target, the target magnetic ground track and target aspect angle will be displayed on the upper left of the multi-function colour display (MFCD) whereas the target closure rate and the calibrated air speed will be displayed in the upper right hand corner of the MFCD. The data block at the left-hand lower corner of the display is used to show the speed (in knots) and altitude of the own ship. Note that in the default page only the speed data will be available while in the radar full page, both the speed and altitude will be available.

Referring to the lower second window display (Altitude Mode Display) of FIG. 1, there is shown the altitude dimension allowing the pilot to visualize the target height. A three-dimensional symbol representation of the own ship provides a clear indication on the "aircraft position", for example, whether it is climbing, diving or rolling. Both the tracked and bugged target will be represented in this view. The lettering within the target symbol denotes the target identity and the shade of the target follows that indicated in the upper window display.

In accordance with the present invention, the pilot of the aircraft can switch the radar page between the single display mode (range/azimuth display) and the dual display mode (range/azimuth display and Altitude mode display).

Figure 3:
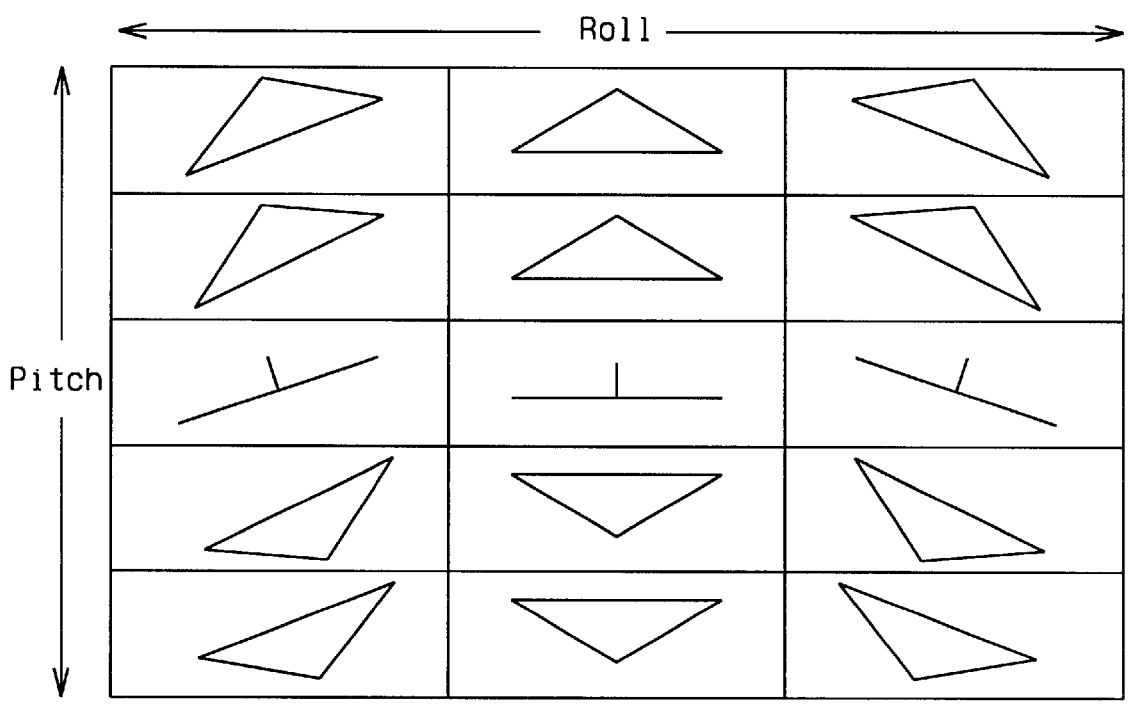
FIG. 3 illustrates the an own ship symbol, giving a three-dimensional perspective in accordance with the present invention.

The own ship symbol changes according to the pitch and roll condition of the aircraft. A 2-dimensional symbol is created and this symbol changes to give a 3-dimensional perspective. FIG. 3 shows a plurality of pitching and rolling actions of the own ship symbol in accordance with the present invention.

Figure 2:
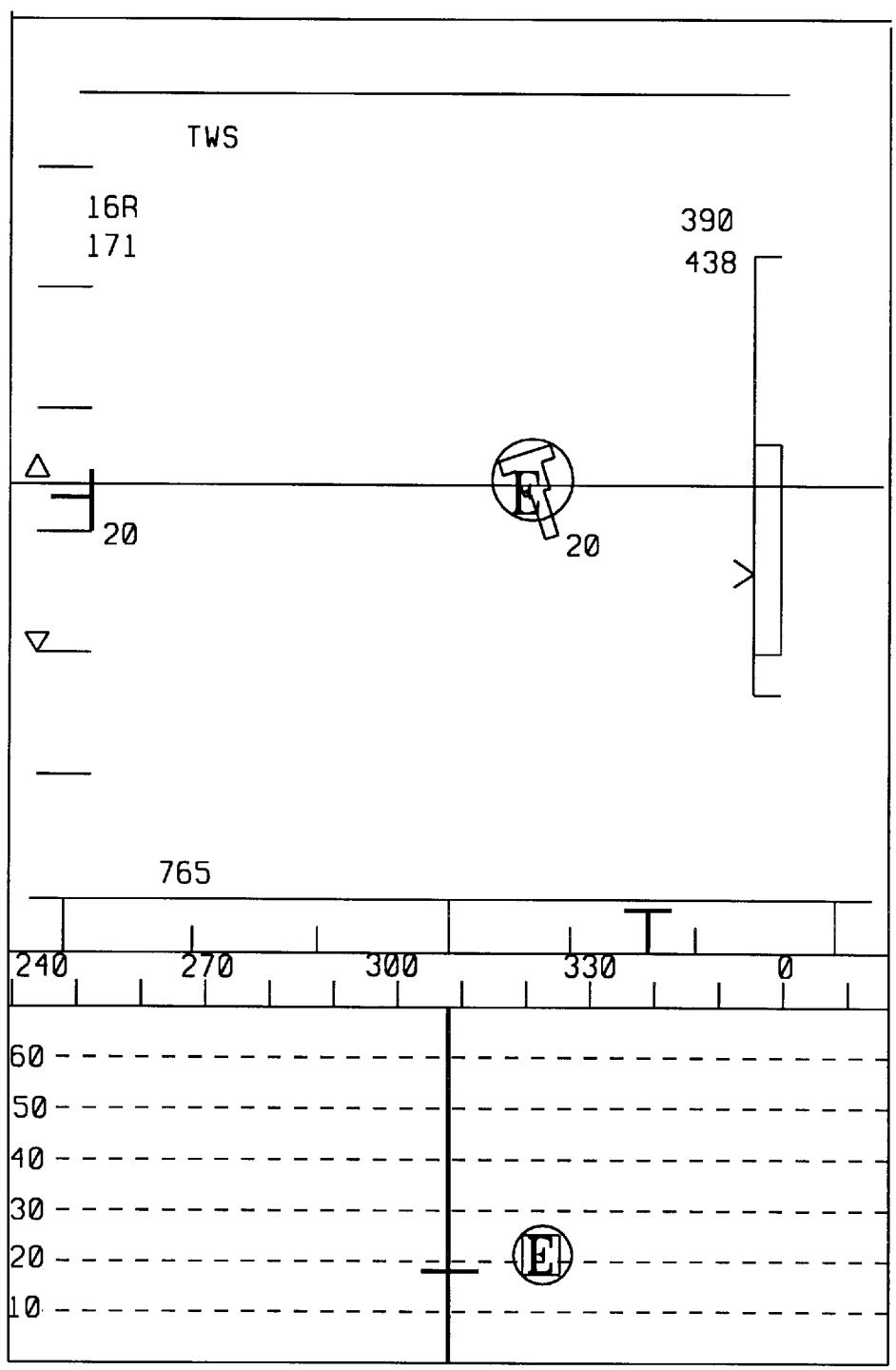
FIG. 2 illustrates the contents of the multi-function radar display in accordance with the present invention.

The rest of the targets' profiles are plotted from the altitude against azimuth perspective. Each of the targets' showing in the split display corresponds to the targets' information as on the B scope display. These allow the pilot to correlate them in the three axis; range, azimuth and elevation, which in turn project a three-dimensional perspective to the pilot. The altitude scale shown in FIG. 2 is presented in thousands of feet and the target's symbol is shown in this split window display.

Flight information, a "simulated" altitude direction indicator is integrated into the radar page to give the pilot the availability to make that as flight guidance information, especially when looking down into the cockpit. The horizon is represented as the center of the blue and brown background. A larger portion of blue region (upper region in FIGS. 1,2 and 4) will be seen when the aircraft is climbing or a larger portion of the brown region (lower region in FIGS. 1,2 and 4) will be seen when the aircraft is diving. A heading scale is incorporated into the radar page as a guidance information and draws the pilot attention to the own ship heading with respect to the rest of the targets.

Figure 4:
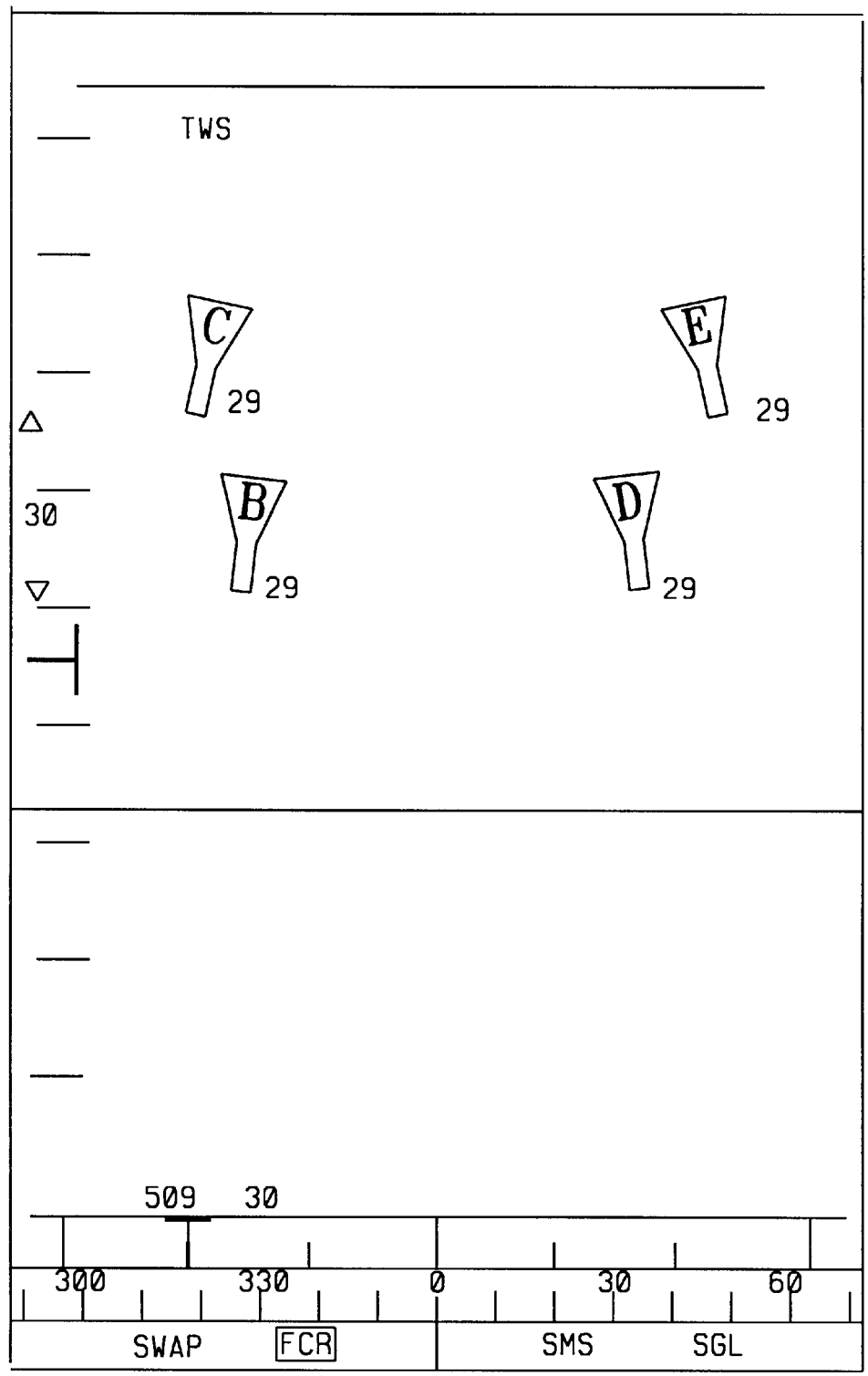
FIG. 4 illustrates the single window radar page in accordance with the present invention.

FIG. 4 shows the single window display with the altitude information removed. The own ship altitude, in thousands of feet, will be displayed at the bottom left hand corner of the display upon the transition to the single window page.

The foregoing discussion of the invention had been described for purpose of illustration and description. The description is not intended to limit the invention to the form disclosed herein and that changes with the purview of the appended claims may be made without departing from the scope and spirit of the invention in its broader aspects.

What is claimed is:

1. A method of forming a virtual three-dimensional radar display on a radar page, said radar page including target information of at least one target detected by a radar system, said method comprising the steps of:
    establishing a split window display showing a 2-dimensional view of altitude representation of own aircraft and target's information; and
    combining range and azimuth information onto the radar page, thereby the radar page providing the pilot of an aircraft with a three-dimensional perspective of the craft and targets' profile.

2. The method of claim 1, wherein the split window display consists of a 2-dimensional own aircraft symbol changing dynamically to provide a three-dimensional perception.

3. The method of claim 1, wherein the split window display further consists of targets' symbol represented in altitude against azimuth.

4. The method of claim 3, wherein the target information in the altitude against azimuth display corresponds to the targets information in the B scope display of the radar display.

5. The method of claim 1, wherein the combination of the altitude against azimuth display and the B scope display gives a three dimensional perspective.

6. The method of claim 1, wherein the flight information includes a simulated altitude direction indicator incorporated to the radar page.

7. The method of claim 4, wherein the simulated altitude direction indicator includes a horizon of blue and brown background underlying the radar B scope and a heading scale running underneath the radar azimuth scale.

8. An apparatus for forming a virtual three-dimensional radar display on a radar page comprising the steps of:
    means for establishing a split window display showing a 2-dimensional view of altitude representation of own aircraft and target's information; and
    means for combining range and azimuth information onto the radar page, thereby the radar page providing a pilot of an aircraft with a three-dimensional perspective of the own aircraft and targets' profile.

9. The apparatus of claim 8, wherein the split window display consists of a 2-dimensional own aircraft symbol changing dynamically to provide a three-dimensional perception.

10. The apparatus of claim 8, wherein the split window display further consists of targets' symbol represented in altitude against azimuth.

11. The apparatus of claim 10, wherein the target information in the altitude against azimuth display corresponds to the targets information in the B scope display of the radar display.

12. The apparatus of claim 8, wherein the combination of the altitude against azimuth display and the B scope display gives a three dimensional perspective.

13. The apparatus of claim 8, wherein the flight information includes a simulated altitude direction indicator incorporated to the radar page.

14. The apparatus of claim 11, wherein the simulated altitude direction indicator includes a horizon of blue and brown background underlying the radar B scope and a heading scale running underneath the radar azimuth scale.

15. A radar system for detecting and displaying at least one target comprising:
   a radar page comprising a virtual three-dimensional radar display, where in said virtual three-dimensional radar display comprises:
      a split window display showing a 2-dimensional view of altitude representation of own aircraft and target's information; and
      a secondary display within said split window display presenting a combined range and azimuth information onto the radar page,
   said the radar page providing a pilot of an aircraft with a three-dimensional perspective of the own aircraft and targets' profile.

16. The radar system of claim 15, wherein the split window display consists of a 2-dimensional own aircraft symbol changing dynamically to a three-dimensional perception.

17. The radar system of claim 15, wherein the split window display further consists of targets' symbol represented in altitude against azimuth.

18. The radar system of claim 17, wherein the target information in the altitude against azimuth display corresponds to the targets information in the B scope display of the radar display.

19. The radar system of claim 15, wherein the combination of the altitude against azimuth display and the B scope display gives a three dimensional perspective.

20. The radar system of claim 15, wherein the flight information includes a simulated altitude direction indicator incorporated to the radar page.

21. The radar system of claim 18, wherein the simulated altitude direction indicator includes a horizon of blue and brown background underlying the radar B scope and a heading scale running underneath the radar azimuth scale.

* * * * *